(12) United States Patent
O'Connor (10) Patent No.: US 6,931,548 B2
(45) Date of Patent: Aug. 16, 2005

(54) SYSTEM AND METHOD FOR LIMITING USE OF A SOFTWARE PROGRAM WITH ANOTHER SOFTWARE PROGRAM

(75) Inventor: Clint H. O'Connor, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 825 days.

(21) Appl. No.: 09/769,869

(22) Filed: Jan. 25, 2001

(65) Prior Publication Data

US 2002/0099951 A1 Jul. 25, 2002

(51) Int. Cl.$^7$ ................................................. H04L 9/32
(52) U.S. Cl. ....................................................... 713/200
(58) Field of Search ................................ 713/165, 200; 705/59

(56) References Cited

U.S. PATENT DOCUMENTS

| | | | |
|---|---|---|---|
| 6,009,401 A | * 12/1999 | Horstmann | ..................... 705/1 |
| 6,212,635 B1 | * 4/2001 | Reardon | ..................... 713/165 |
| 6,243,692 B1 | * 6/2001 | Floyd et al. | ................... 705/59 |
| 2002/0107809 A1 | * 8/2002 | Biddle et al. | ................. 705/59 |

OTHER PUBLICATIONS

"Using MakeCat," http://msdn.microsoft.com/library/psdk/crypto/cryptotools_0jhw.htm, publication date unknown (website notes, "Built on Tuesday, Dec. 05, 2000"; visited Feb. 15, 2001), 1 page.

"MakeCat," http://msdn.microsoft.com/library/psdk/crypto/cryptotools_6ib8.htm, publication date unknown (website notes, "Built on Tuesday, Dec. 05, 2000"; visited Feb. 15, 2001), 2 pages.

"Using Catalog Files," http://msdn.microsoft.com/workshop/delivery/download/overview/catalog.asp, publication date unknown (visited Feb. 15, 2001), 2 pages.

Philip J. Mire, *Public Key Infrastructure Master Key*, Filed May 14, 1999, U.S. Appl. No. 09/312,150, 23 pages.

(Continued)

*Primary Examiner*—Andrew Caldwell
*Assistant Examiner*—Minh Dieu Nguyen
(74) *Attorney, Agent, or Firm*—Hamilton & Terrile, LLP; Stephen A. Terrile (57) ABSTRACT

The present invention presents a system and method for the vendor of a primary software program ("primary vendor") to limit the use of a secondary software program with its primary software program, under a specific set of limiting preconditions, and to retain control over the issuance and duration of the limiting preconditions, where a primary software program is an operating system and a secondary software program is an application software program or a peripheral driver, and where a primary software program is an application software program and a secondary software program is a plug-in. One embodiment of the invention includes: providing a computer including a processor and a memory operably coupled to the processor; providing a first software program operably installed on the computer; providing a second software program capable of being operably installed on the computer and capable of being used interoperably with the first software program; modifying the second software program to include a specific set of preconditions limiting use of the second software program with the first software program; digitally signing the second software program including the specific set of preconditions; determining whether the second software program has been altered after the digitally signing; verifying that the specific set of preconditions limiting use of the second software program with the first software program is met; and running the second software program interoperably with the first software program if and only if (1) the determining determines that the second software program has not been altered after the digitally signing and (2) the verifying verifies that the specific set of limiting preconditions is met.

21 Claims, 3 Drawing Sheets

OTHER PUBLICATIONS

Tracy L. Davis and Timothy J. McNulty, *System and Method for Associating a Certificate of Authenticity with a Specific Computer*, Filed Jan. 24, 2000, U.S. Appl. No. 09/489,727, 15 pages.

T. Gavin Smith, *Single Point of Control for Registration of Multiple Products*, Filed Jun. 5, 2000, U.S. Appl. No. 09/587,728, 27 pages.

"SetReg," http://msdn.microsoft.com/library/psdk/crypto/cryptotools_6xev.htm, publication date unknown (website notes, "Built on Tuesday, Dec. 05, 2000"; visited May 5, 2001), 2 pages.

"Using SetReg," http://msdn.microsoft.com/library/psdk/crypto/cryptotools_3jxj.htm, publication date unknown (website notes, "Built on Tuesday, Dec. 05, 2000"; visited May 5, 2001), 1 page.

"Code Signaling Digital IDs," http://www/verisign.com/products/signing/index.html, publication date unknown (visited May 5, 2001), 2 pages.

\* cited by examiner

SYSTEM AND METHOD FOR LIMITING USE OF A SOFTWARE PROGRAM WITH ANOTHER SOFTWARE PROGRAM

BACKGROUND OF THE INVENTION

1. Field of the Invention

This invention relates to the fields of computer system manufacturing, packaging, and distribution processes and computer operations. More specifically, this invention relates to a process for ensuring that a software program vendor or its authorized proxy can approve a specific set of preconditions limiting use of another software program with its software program.

2. Description of the Related Art

Computer systems have attained widespread use for providing computing power to many segments of today's modem society. A personal computer system can usually be defined as a desk top, floor standing, or portable microcomputer that includes a system unit having a system processor and associated volatile and non-volatile memory, a display monitor, a keyboard, one or more diskette drives, a fixed disk storage device and an optional printer. One of the distinguishing characteristics of these systems is the use of a system board to connect these components together electrically. These personal computer systems are information handling systems which are designed primarily to give independent computing power to a single user (or a group of users in the case of personal computers which serve as computer server systems) and are inexpensively priced for purchase by individuals or small businesses.

A personal computer system may also include one or more of a plurality of input/output ("I/O") devices that are coupled to the system processor and that perform specialized functions. Examples of I/O peripheral devices include modems, sound and video devices, or specialized communication devices. Mass storage devices such as hard disks, compact disk ("CD") drives of many varieties, magneto-optical drives, and other data storage devices are also considered to be peripheral devices. A peripheral device is typically accompanied by a software program called a peripheral device driver ("peripheral driver" or "driver") that must be loaded and must be run under by the OS installed on a computer system so that the peripheral device can work with the computer system.

A personal computer system may also include one or more of a plurality of software programs for the performance of a variety of application functions, e.g., word processing programs, document management programs, electronic mail programs, among many programs available ("application software programs" or "applications"). An application software program must be loaded by and must be run under the operating system ("OS") that is installed on a computer system so that the application can be used with the computer system. As used herein, "applications" and "application software programs" include all software programs used on a personal computer system that are not OSs or peripheral drivers.

Many application software programs often make use of one or more "plug-ins," i.e., software programs that run concurrently with and/or work with applications to provide added functionality.

Herein, the term "primary software program" is used to refer (1) to an OS in relation to an application software program or a peripheral driver or running under the OS, and (2) to an application software program in relation to a plug-in working with the application software program. Hereinafter, the term "secondary software program" will be used to refer (1) to an application software program or a peripheral driver in relation to an OS that loads the application software program or peripheral driver or that runs the application software program or peripheral driver, and (2) to a plug-in in relation to an application software program that works with the plug-in.

The terms "running interoperably," "running with," "using interoperably," "using with," "working interoperably," and similar terms used herein refer to the relationship between an application software program or a peripheral driver and an OS when the application software program or peripheral driver is running under the OS; to the relationship between a plug-in and an application software program when the plug-in is working with the application software program; and generally, to the relationship between a second software program and a first software program when the second software program is running under and/or working with the first software program.

Under certain circumstances common in the computer industry, it is desirable for a vendor of a primary software program ("primary vendor") to impose a secondary software program vended by another vendor ("secondary vendor") a specific set of preconditions limiting use of a secondary software program with a primary software program. For example, the secondary software program may fail the primary vendor's test procedure but work well enough to be sold, and the secondary vendor must begin selling the secondary software program by a particular release date; or, the primary vendor may not have a test for the secondary software program in question and wishes to limit the use of such an untested secondary software program with its primary software program. The primary vendor may, e.g., wish to block the use of such a secondary software program with its primary software program unless the secondary software program has been granted a waiver by the primary vendor, enabling the use of such the secondary software program under a waiver for a limited period of time. Further, the primary vendor may wish to control both the grant and the duration of the waiver. At the expiration date of the designated time period, the primary vendor may wish to extend the waiver or require the use of an approved secondary software program with its primary software program.

The primary vendor may wish to extend such waiver authority to a proxy. All references herein to "primary vendor" refer to a primary vendor or a primary vendor's proxy unless otherwise indicated.

The specific set of limiting preconditions that may be desired includes but is not limited to: operation of a particular class of secondary software programs, such as secondary software programs from a specific secondary vendor, with a primary software program; operation of a specific secondary software program with a specific primary software program; time limits on the operation of a secondary software program; or a combination of those or other limitations, including the examples already discussed.

Existing procedures fulfill some, but not all, of the needs described above. One procedure allows a user to use a secondary software program for a predetermined period of time, then requires the entry of a registration key obtained from the secondary vendor for use past that period of time. Generally, once such a registration key is issued and entered, it allows the user to continue to use the secondary software program permanently. This method limits the use of a secondary software program without the key to a particular period of time, but it does not provide for the option of extending the period. (This method does provide for requiring replacement of the secondary software program, but only by refusing to allow issuance of a key to permit continued use.) Another procedure allows a user to use a secondary software program for a period during which a temporary key is provided. The secondary software program validates the key by checking with a key authentication server, for instance, via a network or an Internet connection. At the end of the period, the means of key authentication is removed from the server, so the secondary software program can no longer validate the key, thus blocking the secondary software program from operating. This method is limited to systems to which the primary vendor has access (specifically, in the example given, via the key authentication server connected to the user's computer via a network or an Internet connection).

What is needed is a system or method that provides a primary vendor a way to impose a specific set of preconditions limiting use of a secondary software program with a primary software program, e.g., operation of a particular class of secondary software programs, such as secondary software programs from a specific secondary vendor, with a primary software program; operation of a specific secondary software program with a specific primary software program; time limits on the operation of a secondary software program, along with a way to extend such time limits; or a combination of those or other limitations, including the examples already discussed.

SUMMARY OF THE INVENTION

In accordance with the present invention, a system and method are presented for enabling a primary vendor to impose a specific set of preconditions limiting use of a secondary software program with a primary software program. The system and method presented are effective without requiring the user's system to connect to another system. Regarding the use of secondary software programs with a primary vendor, the specific set of limiting preconditions provided for by the present invention includes but is not limited to operation of a particular class of secondary software programs, such as secondary software programs from a specific secondary vendor, with a primary software program; operation of a secondary software program with a specific primary software program; time limits on the operation of a secondary software program, along with a way to extend such time limits; or a combination of those or other items.

In one scenario in which use of the invention is envisaged, an OS vendor enables the use of an application software program or a peripheral driver under a waiver under a specific set of limiting preconditions and retains control over the issuance and duration of the waiver. The application software program or peripheral driver vendor presents the application software program or peripheral driver to the OS vendor. The application software program or peripheral driver vendor requires a waiver from the OS vendor to permit the application software program or a peripheral driver to be used with the OS vendor's OS, and the OS vendor approves such a waiver.

In an analogous scenario in which use of the invention is envisaged, an application software program vendor enables the use of a plug-in under a waiver under a specific set of limiting preconditions and retains control over the issuance and duration of the waiver. The plug-in vendor presents the plug-in to the application software program vendor. The plug-in requires a waiver from the application vendor to permit the plug-in to be used with the application vendor's application, and the application vendor approves such a waiver.

The phrases "digitally signing," "applying a digital signature to," and similar phrases, as used herein, comprise any and all procedures for modifying any software program such as a secondary software program, including a specific set of preconditions limiting use of the secondary software program with a primary software program (if any such preconditions are included therein), to permit determination of alteration of the software program, including alteration of any such included limiting preconditions. The phrase "verifying a digital signature," and similar phrases, as used herein, comprise any and all procedures for determination of alteration of the software program, including alteration of any such included limiting preconditions, by checking a digital signature.

In a first embodiment, the invention comprises a method that comprise providing a computer including a processor and a memory operably coupled to the processor; providing a first software program capable of being operably installed on the computer; providing a second software program capable of being operably installed on the computer and capable of being used interoperably with the first software program; modifying the second software program to include data defining a specific point in time after which the second software program cannot be used interoperably with the first software program; digitally signing the second software program including the data defining the specific point in time; determining whether the second software program has been altered after the digitally signing; verifying that the specific point in time has not passed; and using the second software program interoperably with the first software program if and only if the determining determines that the second software program has not been altered after the digitally signing and the verifying verifies that the specific point in time has not passed.

In a second embodiment, the invention is the invention of the first embodiment, further comprising verifying after the using that the specific point in time has not passed and blocking interoperable use of the second software program with the first software program if the specific point in time has passed.

The procedures comprised by "digitally signing" include but are not limited to the procedure used in a third embodiment of the invention, comprising producing one-way hash indexes of every file in the secondary software program, including a specific set of preconditions limiting use of the secondary software program with a primary software program; storing the one-way hash indexes of every file in the secondary software program in a catalog file; storing a list of the files in the secondary software program in the catalog file; and producing a first hash index of the catalog file including the stored one-way hash indexes of files and the stored list of files. (The catalog file, a file that includes at least a list of all the files in the secondary software program, is often called the ".CAT" file after the file extension used for catalog files written for use with the WINDOWS™ OS.) The foregoing procedure produces a "digitally signed secondary software program," as that phrase and similar phrases are used herein. The specified set of limiting preconditions may be stored in a device information file, a file containing scripts used to control hardware operations (often called the ".INF" file after the file extension used for device information files written for use with the WINDOWS™ OS).

After a digitally signed secondary software program is produced, the specific preconditions limiting use of the secondary software program with a primary software program, among the other contents of the secondary software program, cannot be altered without altering the catalog file or the hash indexes of the files stored in the digitally signed secondary software program.

In this third embodiment of the invention, before the secondary software program is run interoperably with the first software program, it is determined whether the secondary software program can be run under the specific set of limiting preconditions by producing a second one-way hash index of the secondary software program's catalog file, including the stored one-way hash indexes of files and the stored list of files; comparing the first and the second one-way hash indexes of the catalog files in the software program; and concluding, with a high degree of confidence, that the software program has not been altered if and only if the first and the second one-way hash indexes are substantially identical. From this procedure, one can conclude with a high degree of confidence that the secondary software program's specific set of preconditions limiting use of the secondary software program with a primary software program has not been altered and that the secondary software program can be used with the primary software program.

Other algorithms satisfying the requirement to authenticate the validity of the catalog file or of the entire secondary software program may be employed. Further processing may be required to determine the validity of the individual files protected by the digital signature, such as computing hashes or cyclic redundancy checks or other means of verification against predetermined values protected by the digital signature. If the expiration date has not passed, the secondary software program is run interoperably with the primary software program. If the date has passed, the secondary software program is not run interoperably with the primary software program.

It will be understood by those skilled in the art that the functions served by applying a digital signature, i.e., (1) the function of modifying a software program to permit determination of whether the software program or plug-in has been altered and (2) the function of determining whether such alteration has occurred, may be performed in a variety of ways, e.g., public key cryptography without one-way hash functions, cyclic redundancy check algorithms, checksums, or any other program code change detection mechanisms that may be employed on some or all of the files in the secondary software program in any combination necessary to accomplish the authentication and prevent use of the secondary software program with the primary software program if the specific set of limiting preconditions is not met.

In a fourth embodiment, the invention comprises a computer system comprising a processor; a first software program capable of being operably coupled to the processor; a digitally signed second software program, the second software program capable of being operably coupled to the processor, capable of being used interoperably with the first software program, and including data defining a specific point in time after which the second software program cannot be used interoperably with the first software program; and a memory coupled to the processor, the memory including means for determining whether the second software program has been altered, means for verifying that the specific point in time has not passed, and means for using the second software program interoperably with the first software program if and only if it is determined that the second software program has not been altered and it is verified that the specific point in time has not passed.

In a fifth embodiment, the invention is the invention of the fourth embodiment wherein the memory coupled to the processor further includes means for verifying after an interoperable use of the second software program with the first software program that the specific point in time has not passed and means for blocking interoperable use of the second software program with the first software program if the specific point in time has passed.

In a sixth embodiment, the invention comprises an apparatus for limiting use of a first software program interoperably with a second software program comprising means for modifying the second software program to include data defining a specific point in time after which the second software program cannot be used interoperably with the first software program; means for digitally signing the second software program including the data defining the specific point in time; means for determining whether the second software program has been altered after the digitally signing; means for verifying that the specific point in time has not passed; and means for using the second software program interoperably with the first software program if and only if it is determined that the second software program has not been altered after the digitally signing and it is verified that the specific point in time has not passed.

In a seventh embodiment of the invention, the invention is the invention of the sixth embodiment, further comprising means for verifying after an interoperable use of the second software program with the first software program that the specific point in time has not passed and means for blocking interoperable use of the second software program with the first software program if the specific point in time has passed.

In an eighth embodiment, the invention comprises a method comprising providing a computer including a processor and a memory operably coupled to the processor; providing an application software program capable of being operably installed on the computer; providing a plug-in capable of being operably installed on the computer and capable of being used interoperably with the application software program; modifying the plug-in to include a specific set of preconditions limiting use of the plug-in interoperably with the application software program; digitally signing the plug-in including the specific set of preconditions; determining whether the plug-in has been altered after the digitally signing; verifying that the specific set of preconditions limiting use of the plug-in interoperably with the application software program is met; and using the plug-in interoperably with the application software program if and only if the determining determines that the plug-in has not been altered after the digitally signing and the verifying verifies that the specific set of preconditions is met.

In a ninth embodiment of the invention, the invention is the invention of the eighth embodiment, wherein the specific set of preconditions limiting use of the second software program interoperably with the first software program includes data defining a specific point in time after which the second software program cannot be used interoperably with the first software program.

In a tenth embodiment of the invention, the invention is the invention of the eighth embodiment, further comprising verifying after the using that the specific set of preconditions limiting use of the second software program interoperably with the first software program continues to be met and blocking interoperable use of the second software program with the first software program if any of the specific set of preconditions limiting use are not met.

In an eleventh embodiment, the invention comprises a computer system comprising a processor; a first software program capable of being operably coupled to the processor; a digitally signed second software program, the second software program capable of being operably coupled to the processor, capable of being used interoperably with the first software program, and including data defining a specific point in time after which the second software program cannot be used interoperably with the first software program; and a memory coupled to the processor, the memory including a circuit for determining whether the second software program has been altered, a circuit for verifying that the specific point in time has not passed, and a circuit for using the second software program interoperably with the first software program if and only if the circuit for determining determines that the second software program has not been altered and the circuit for verifying verifies that the specific point in time has not passed.

In a twelfth embodiment of the invention, the invention is the invention of the eleventh embodiment, wherein the memory coupled to the processor further includes a circuit for verifying after an interoperable use of the second software program with the first software program that the specific point in time has not passed and a circuit for blocking interoperable use of the second software program with the first software program if the specific point in time has passed.

In a thirteenth embodiment, the invention comprises an apparatus for limiting use of a first software program interoperably with a second software program including a circuit for modifying the second software program to include data defining a specific point in time after which the second software program cannot be used interoperably with the first software program; a circuit for digitally signing the second software program including the data defining the specific point in time; a circuit for determining whether the second software program has been altered after the digitally signing; a circuit for verifying that the specific point in time has not passed; and a circuit for using the second software program interoperably with the first software program if and only if the circuit for determining determines that the second software program has not been altered after the digitally signing and the circuit for verifying verifies that the specific point in time has not passed.

In a fourteenth embodiment of the invention, the invention is the invention of the thirteenth embodiment, further including a circuit for verifying after an interoperable use of the second software program with the first software program that the specific point in time has not passed and a circuit for blocking interoperable use of the second software program with the first software program if the specific point in time has passed.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element unless otherwise noted.

DETAILED DESCRIPTION

The following sets forth a detailed description of a mode for carrying out the invention. The description is intended to be illustrative of the invention and should not be taken to be limiting.

Figure 1:
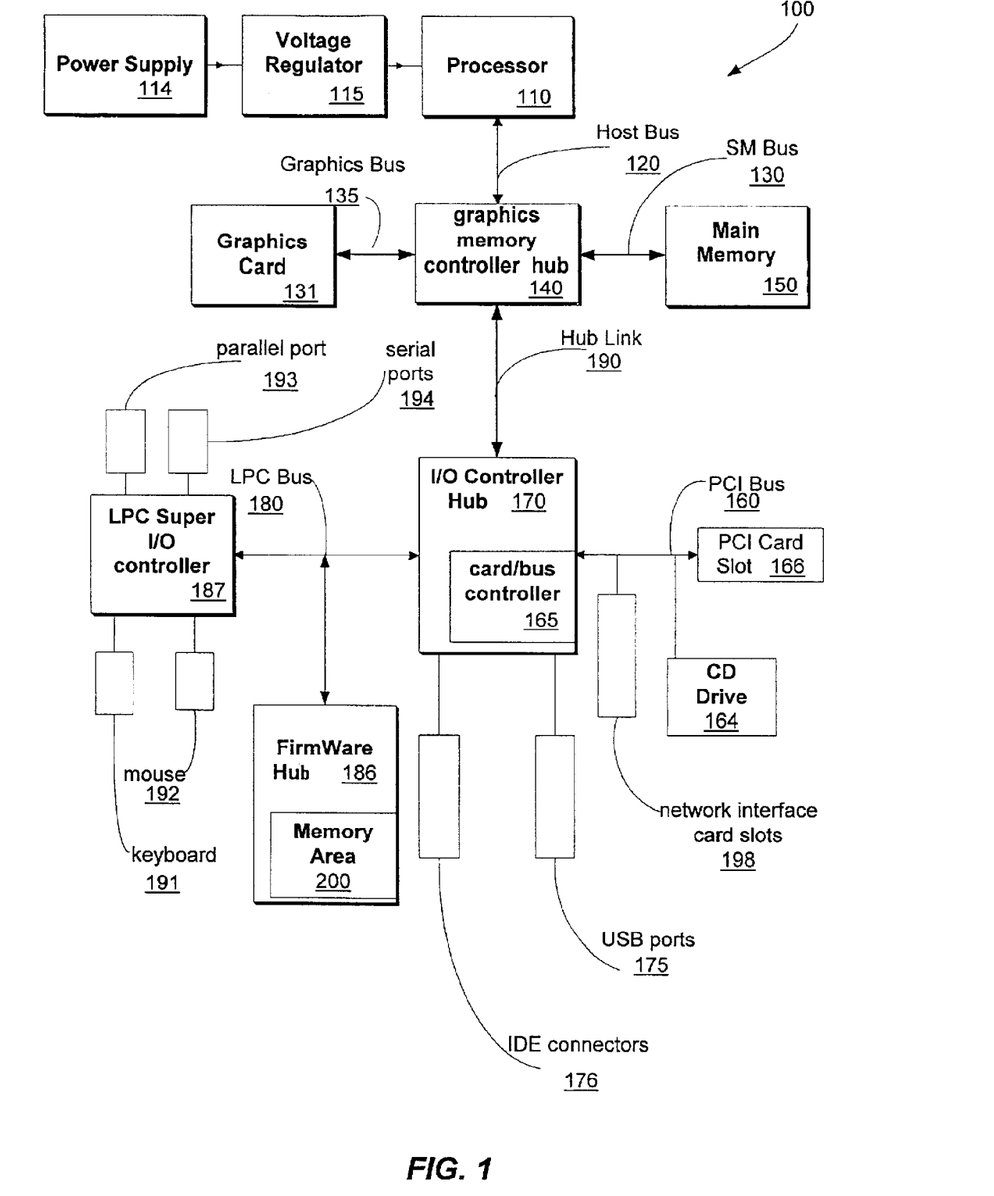
FIG. 1 is a block diagram showing many features of a typical computer system.

FIG. 1 is a block diagram of an exemplary computer system 100 that may be found in many forms, including, e.g., mainframes, minicomputers, workstations, servers, personal computers, internet terminals, notebooks, and embedded systems. Personal computer ("PC") systems, such as those compatible with the x86 configuration, include desktop, floor standing, or portable versions. Exemplary computer system 100 includes a computer system hardware unit that further includes a microprocessor (or simply "processor") 110, associated main memory 150, and a number of peripheral devices that provide I/O for the system 100, and computer system software that runs on the hardware unit. Exemplary computer system 100 is powered by a power supply 114 with voltage regulator 115. The peripheral devices often include keyboards 191, mouse-type input devices 192, CD drive 164, and others not shown, including monitors, floppy and hard disk drives, modems, printers, terminal devices, televisions, sound devices, voice recognition devices, electronic pen devices, and mass storage devices such as tape drives or digital video disks ("DVDs"). The peripheral devices usually communicate with the processor over one or more peripheral component interconnect ("PCI") slots 166, universal serial bus ("USB") ports 175, or integrated device electronics ("IDE") connectors 176. The PCI slots 166 may use a card/bus controller 165 to connect to one or more buses such as host bus 120, PCI bus 160, and low pin count ("LPC") bus 180, with the buses communicating with each other through the use of one or more hubs such as graphics controller memory hub 140 and I/O controller hub 170. Typical systems such as exemplary system 100 often include network interface cabling slots 198 to accommodate network cards that mediate between the computer and the physical media over which transmissions to and from system 100 travel. The USB ports 175 and IDE connectors 176 may connect to one or more of the hubs 140, 170. The hubs may communicate with each other through the use of one or more links such as hub link 190. Many I/O devices can also be accommodated by parallel ports 193 and serial ports 194 that are coupled to an I/O controller 187 that is in turn coupled to a LPC bus 180. Typical computer systems often include a graphics card 131 coupled to a graphics memory controller hub 140 by a graphics bus 135 and a main memory 150 coupled to a graphics memory controller hub 140 by a System Management ("SM") bus 130. Finally, a typical computer system also includes software modules known as the basic input/output system (BIOS) (not shown). The BIOS code is either copied from an external medium such as a CD to, or stored on, the memory area 200 in firmware hub 186.

In a scenario in which use of the invention is envisaged, a vendor supplies an application software program, or a peripheral driver for a peripheral device, e.g., keyboard 191, mouse-type input device 192, CD drive 164, or a device not shown in FIG. 1, e.g., a monitor, a floppy or hard disk drive, a modem, or a printer. In an analogous scenario in which use of the invention is envisaged, a vendor supplies a plug-in to be used with an application installed on computer system 100.

Figure 2:
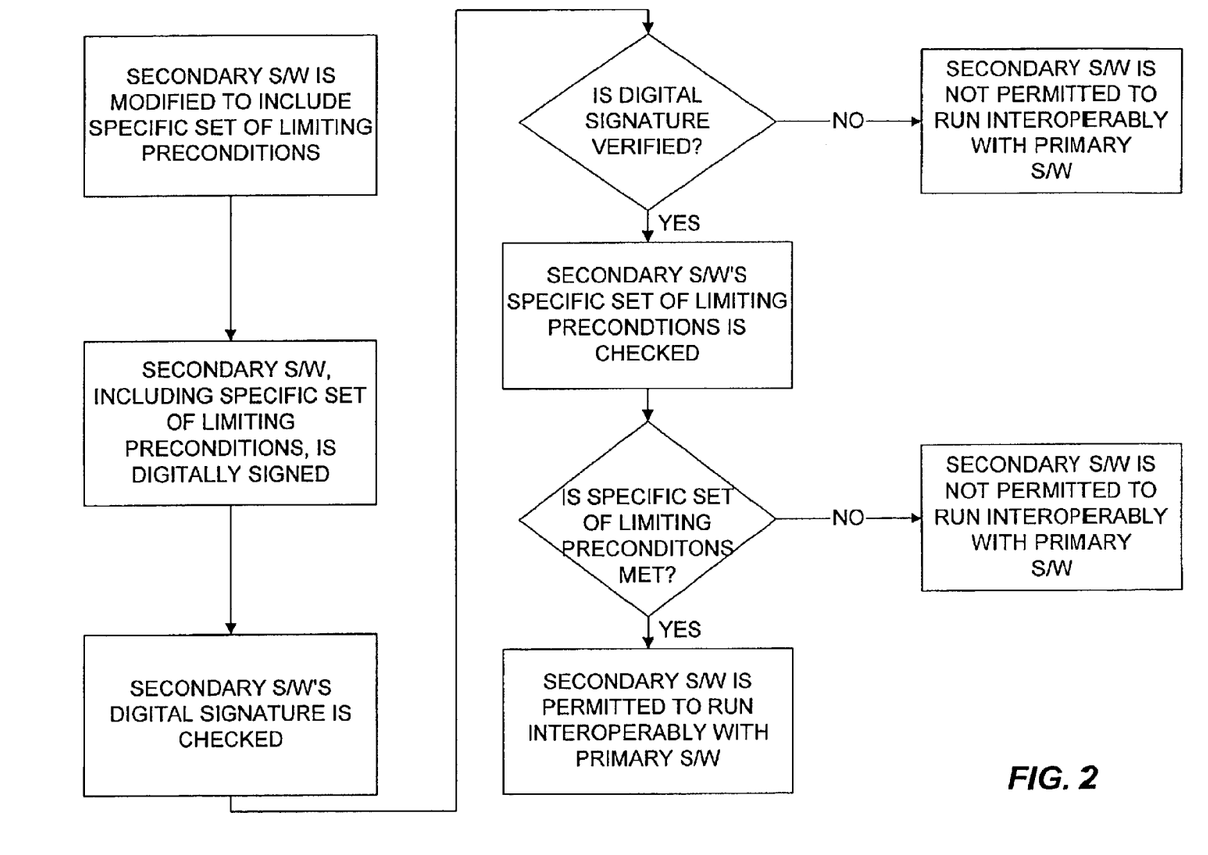
FIG. 2 shows a flow chart indicating the steps of an embodiment of the present invention.

FIG. 2 shows the steps included in an embodiment of the present invention. A secondary software program ("secondary s/w program" in the Figures) is modified to include a specific set of limiting preconditions and is digitally signed. The specific set of limiting preconditions can be stored in any file of the secondary software program that is protected by the digital signing. The process of loading the secondary software program onto computer system 100, if not already loaded, and running it may be started by, e.g., placing a CD containing the secondary software program into CD drive 164, shown in FIG. 1. The digital signature is verified, checking that the software program, including the specific set of limiting preconditions, has not been altered. If the digital signature is not verified, the secondary software program, if not already loaded, is not loaded, or if already loaded, is not allowed to run or to work with the primary software program. If the digital signature on the secondary software program is verified, the specific set of limiting preconditions in the secondary software program is checked. If the specific set of limiting preconditions is not met, the software program, if not already loaded, is not loaded, or if already loaded, is not allowed to run or to work with the primary software program. If the specific set of limiting preconditions is met, the secondary software program, if not loaded, is loaded, and in any case is allowed to run or to work with the primary software program on computer system 100.

Figure 3:
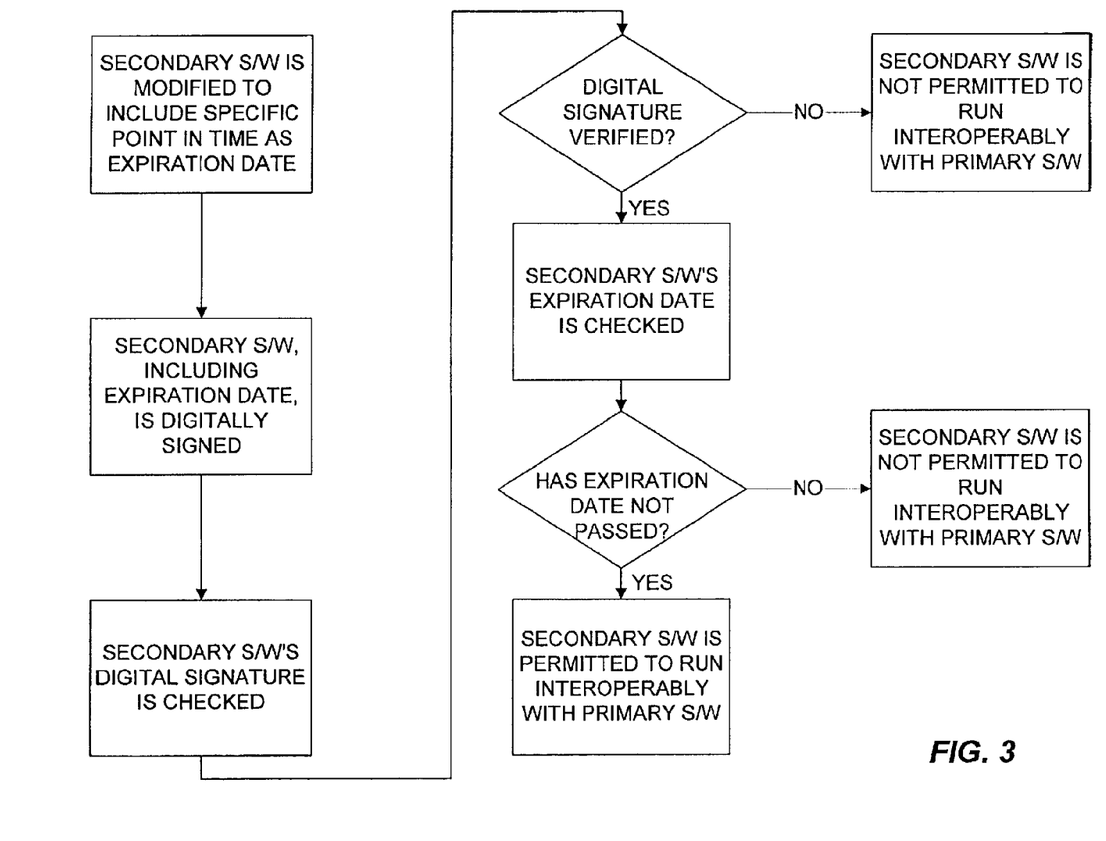
FIG. 3 shows a flow chart indicating the steps of another embodiment of the present invention.

FIG. 3 shows the steps included in an embodiment of the present invention in which the specific set of limiting preconditions consists of an expiration date, i.e., a specific date and time past which the secondary software program is not approved for operation with a primary software program. A secondary software program is modified to include the expiration date and is digitally signed. The specific set of limiting preconditions can be stored in any file of the secondary software program that is protected by the digital signing. The process of loading the secondary software program onto computer system 100, if not already loaded, and running it is started by, e.g., placing a CD containing the software program into CD drive 164, shown in FIG. 1. The digital signature is verified, checking that the software program, including the specific set of limiting preconditions, has not been altered. If the digital signature is not verified, the secondary software program, if not already loaded, is not loaded, or if already loaded, is not allowed to run or to work with the primary software program. If the digital signature on the secondary software program is verified, the expiration date is checked. If the expiration date has passed, the software program, if not already loaded, is not loaded, or if already loaded, is not allowed to run or to work with the primary software program. If the expiration date has not passed, the secondary software program, if not loaded, is loaded, and in any case is allowed to run or to work with the primary software program on computer system 100.

In another embodiment of the present invention, in which the specific set of limiting preconditions consists of an expiration date (and the steps of which are not illustrated in a figure), the primary software program periodically determines after the secondary software program is loaded or installed whether the digitally signed secondary software program has been altered and then verifies that the software program's expiration date has not passed. This periodic determination may be made in any fashion and at any time deemed necessary, e.g., each time the OS does a cold or a warm reboot. If the expiration date has not passed, notifications may be issued to the user that the expiration date is approaching, and stops allowing the secondary software program to operate after the expiration date passes, or after some specified point in time after the expiration date (e.g., if a "grace period" is desired). The period from initial loading of the software program to stopping software program operation can be of any length, including zero. A primary vendor can extend an expiration date by digitally signing the secondary software program with an extended expiration date and the secondary software program user can use a version or copy of the secondary software program with the new expiration date and digital signature.

In another embodiment of the present invention, in which the specific set of limiting preconditions consists of an expiration date (and the steps of which are not illustrated in a figure), a software programs loaded before the expiration date passes and not blocked from use after the expiration date passes (or the end of any grace period after the expiration date), are usable thereafter with no extension being necessary.

One skilled in the art will recognize that the foregoing components (e.g., steps), devices, and objects in FIGS. 1, 2, and 3 the discussion accompanying them are used as examples for the sake of conceptual clarity and that various configuration modifications are common. Consequently, as used herein the specific exemplars set forth in FIGS. 1, 2, and 3 and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

While particular embodiments of the present invention have been shown and described, it will be obvious to those skilled in the art that, based upon the teaching herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

Furthermore, it is to be understood that the invention is solely defined by the appended claims. It will be understood by those within the art that if a specific number of an introduced claim element is intended, such an intent will be explicitly recited in the claim, and in the absence of such recitation no such intent is present. For example, as an aid to understanding, the following appended claims may contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use of definite articles used to introduce claim elements. In addition, even if a specific number of an introduced claim element is explicitly recited, those skilled in the art will recognize that such recitation should typically be interpreted to mean at least the recited number (e.g., the bare recitation of "two elements," without other modifiers, typically means at least two elements, or two or more elements).

What is claimed is:

1. A method comprising:
   providing a computer including
      a processor and
      a memory operably coupled to the processor;

providing a first software program capable of being operably installed on the computer;

providing a second software program capable of being operably installed on the computer and capable of being used interoperably with the first software program;

modifying the second software program to include data defining a specific point in time after which the second software program cannot be used interoperably with the first software program;

digitally signing the second software program including the data defining the specific point in time;

determining whether the second software program has been altered after the digitally signing;

verifying that the specific point in time has not passed; and using the second software program interoperably with the first software program if and only if the determining determines that the second software program has not been altered after the digitally signing and the verifying verifies that the specific point in time has not passed; and wherein.

the second software program includes a device information file and the data defining the specific point in time is included in the device information file.

2. The method of claim 1, further comprising verifying after the using that the specific point in time has not passed and blocking interoperable use of the second software program with the first software program if the specific point in time has passed.

3. The method of claim 1, wherein the first software program is an operating system and the second software program is an application software program.

4. The method of claim 1, wherein the first software program is an operating system and the second software program is a peripheral driver.

5. The method of claim 1, wherein the first software program is an application software program and the second software program is a plug-in.

6. A computer system comprising:

a processor;

a first software program capable of being operably coupled to the processor;

a digitally signed second software program, the second software program capable of being operably coupled to the processor, capable of being used interoperably with the first software program, and including data defining a specific point in time after which the second software program cannot be used interoperably with the first software program; and a memory coupled to the processor, the memory including means for determining whether the second software program has been altered, means for verifying that the specific point in time has not passed, and means for using the second software program interoperably with the first software program if and only if it is determined that the second software program has not been altered and it is verified that the specific point in time has not passed and wherein, the second software program includes a device information file and the data defining the specific point in time is included in the device information file.

7. The computer system of claim 6, wherein the memory coupled to the processor further includes means for verifying after an interoperable use of the second software program with the first software program that the specific point in time has not passed and means for blocking interoperable use of the second software program with the first software program if the specific point in time has passed.

8. The computer system of claim 6, wherein the first software program is an operating system and the second software program is an application software program.

9. The computer system of claim 6, wherein the first software program is an operating system and the second software program is a peripheral driver.

10. The computer system of claim 6, wherein the first software program is an application software program and the second software program is a plug-in.

11. An apparatus for limiting use of a first software program interoperably with a second software program comprising:

means for modifying the second software program to include data defining a specific point in time after which the second software program cannot be used interoperably with the first software program;

means for digitally signing the second software program including the data defining the specific point in time;

means for determining whether the second software program has been altered after the digitally signing;

means for verifying that the specific point in time has not passed; and means for using the second software program interoperably with the first software program if and only if it is determined that the second software program has not been altered after the digitally signing and it is verified that the specific point in time has not passed and wherein, the second software program includes a device information file and the data defining the specific point in time is included in the device information file.

12. The apparatus of claim 11, further comprising:

means for verifying after an interoperable use of the second software program with the first software program that the specific point in time has not passed and means for blocking interoperable use of the second software program with the first software program if the specific point in time has passed.

13. The apparatus of claim 11, wherein the first software program is an operating system and the second software program is an application software program.

14. The apparatus of claim 11, wherein the first software program is an operating system and the second software program is a peripheral driver.

15. The apparatus of claim 11, wherein the first software program is an application software program and the second software program is a plug-in.

16. A method comprising:

providing a computer including a processor and a memory operably coupled to the processor;

providing an application software program capable of being operably installed on the computer;

providing a plug-in capable of being operably installed on the computer and capable of being used interoperably with the application software program;

modifying the plug-in to include a specific set of preconditions limiting use of the plug-in interoperably with the application software program;

digitally signing the plug-in including the specific set of preconditions;

determining whether the plug-in has been altered after the digitally signing;

verifying that the specific set of preconditions limiting use of the plug-in interoperably with the application software program is met; and using the plug-in interoperably with the application software program if and only if the determining determines that the plug-in has not been altered after the digitally signing and the verifying verifies that the specific set of preconditions is met; and wherein the specific set of preconditions limiting use of the plug-in interoperably with the first software program includes data defining a specific point in time after which the second software program cannot be used interoperably with the first software program;

the plug-in includes a device information file and the data defining the specific point in time is included in the device information file.

17. The method of claim 16, further comprising verifying after the using that the specific set of preconditions limiting use of the second software program interoperably with the first software program continues to be met and blocking interoperable use of the second software program with the first software program if any of the specific set of preconditions limiting use are not met.

18. A computer system comprising:

a processor;

a first software program capable of being operably coupled to the processor;

a digitally signed second software program, the second software program capable of being operably coupled to the processor, capable of being used interoperably with the first software program, and including data defining a specific point in time after which the second software program cannot be used interoperably with the first software program; and a memory coupled to the processor, the memory including a circuit for determining whether the second software program has been altered, a circuit for verifying that the specific point in time has not passed, and a circuit for using the second software program interoperably with the first software program if and only if the circuit for determining determines that the second software program has not been altered and the circuit for verifying verifies that the specific point in time has not passed; and wherein the second software program includes a device information file and the data defining the specific point in time is included in the device information file.

19. The computer system of claim 18, wherein the memory coupled to the processor further includes a circuit for verifying after an interoperable use of the second software program with the first software program that the specific point in time has not passed and a circuit for blocking interoperable use of the second software program with the first software program if the specific point in time has passed.

20. An apparatus for limiting use of a first software program interoperably with a second software program comprising:

a circuit for modifying the second software program to include data defining a specific point in time after which the second software program cannot be used interoperably with the first software program;

a circuit for digitally signing the second software program including the data defining the specific point in time;

a circuit for determining whether the second software program has been altered after the digitally signing;

a circuit for verifying that the specific point in time has not passed; and a circuit for using the second software program interoperably with the first software program if and only if the circuit for determining determines that the second software program has not been altered after the digitally signing and the circuit for verifying verifies that the specific point in time has not passed; and wherein the second software program includes a device information file and the data defining the specific point in time is included in the device information file.

21. The apparatus of claim 20, further comprising:

a circuit for verifying after an interoperable use of the second software program with the first software program that the specific point in time has not passed and a circuit for blocking interoperable use of the second software program with the first software program if the specific point in time has passed.

* * * * *